United States Patent

Hilmer et al.

[11] Patent Number: 5,226,759
[45] Date of Patent: Jul. 13, 1993

[54] LINE DIVERTER AND SEALING ARRANGEMENT FOR IT

[75] Inventors: Jens Hilmer; Werner Huber, both of Braunschweig, Fed. Rep. of Germany

[73] Assignee: Bühler GmbH, Braunschweig, Fed. Rep. of Germany

[21] Appl. No.: 830,697

[22] Filed: Feb. 4, 1992

[30] Foreign Application Priority Data

May 4, 1991 [DE] Fed. Rep. of Germany ....... 4110996

[51] Int. Cl.⁵ .............................................. B65G 51/24
[52] U.S. Cl. ................................................... 406/182
[58] Field of Search ................................... 406/1, 182

[56] References Cited

U.S. PATENT DOCUMENTS

| | | | |
|---|---|---|---|
| 431,699 | 7/1890 | Leake | 406/182 X |
| 721,743 | 3/1903 | Richmond | 406/182 |
| 3,188,145 | 6/1965 | Strong | 406/182 R |
| 3,902,682 | 9/1975 | Woll | 406/182 |
| 3,907,374 | 9/1975 | Steele | 406/182 |
| 4,157,848 | 6/1979 | Smoot | 406/182 |
| 4,252,479 | 2/1981 | Scherfenberg | 406/182 |

FOREIGN PATENT DOCUMENTS

| | | |
|---|---|---|
| 1915363 | 2/1965 | Fed. Rep. of Germany . |
| 1968572 | 9/1967 | Fed. Rep. of Germany . |
| 1280788 | 10/1968 | Fed. Rep. of Germany . |
| 610915 | 9/1926 | France .................. 406/182 |
| 1507545 | 12/1967 | France . |
| 140556 | 6/1931 | Switzerland . |
| 133315 | 6/1920 | United Kingdom . |
| 733013 | 7/1955 | United Kingdom . |
| 1014209 | 12/1965 | United Kingdom ........... 406/182 |
| 1423355 | 2/1976 | United Kingdom . |

Primary Examiner—Margaret A. Focarino
Assistant Examiner—Gary C. Hoge
Attorney, Agent, or Firm—Martin A. Farber

[57] ABSTRACT

A line diverter has a valve body (2) comprising at least two channels (3), the valve body (2) being displaceable within a casing (1) provided with at least three tubular connection pieces (4). The casing (1) is gastight. In between valve body (2) and casing (1) there is provided a free gas chamber (12), within which the valve body (2)—with the exception of the front surfaces assigned to the end surfaces (8) of the channels (3)—is so arranged that it does not have any contact with the inner surfaces of the casing. A sealing arrangement, which may be employed also for one-channel or multi-channel rotary diverters, comprises a sealing plate (7) within the casing (1), the sealing plate being provided with at least one open passage area corresponding to the channel end surfaces (8). The sealing plate (7) is compressed against the channel end surface(s) by a force acting perpendicularly to the direction of displacement.

34 Claims, 3 Drawing Sheets

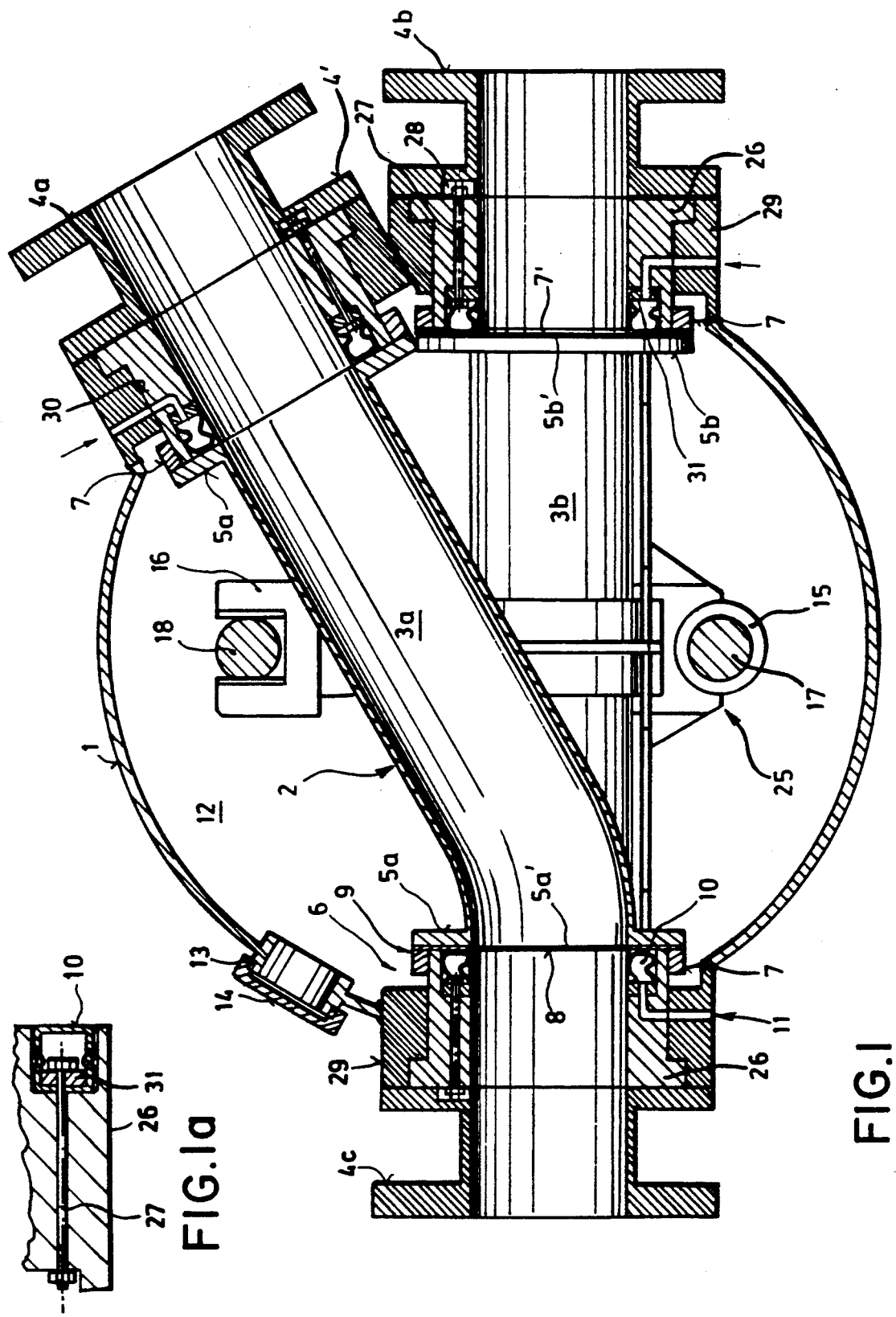

LINE DIVERTER AND SEALING ARRANGEMENT FOR IT

FIELD OF THE INVENTION

The invention relates to a line diverter with a valve body movable within a casing provided with at least three connection pieces, within which valve body at least one connecting channel extends, the valve body being guided within the casing with the aid of a guide unit, whereby, in one of its positions, a direct connection between at least two tubular connection pieces is effected via at least one channel, whereas, in another position of the valve body, another connection will result; as well as to a sealing arrangement particularly for a line diverter, as above, the sealing arrangement comprising a sealing element within a casing including a movable valve body, which contains at least one fluid channel. The valve body has a position in which its channel is aligned with a tubular connection piece, whereas in another position the channel is offset.

BACKGROUND OF THE INVENTION

Multipath diverters of most diverse embodiments, such as one-way or multi-channel diverters, as well as rotary or slidable diverters, are known, which correspond to the varying operating conditions. For example, the FR-PS 1 507 545 and the GB-PS-733 013 disclose rotary diverters and their conical valve bodies. When revolving the switching valve or the valve body, respectively, a selective connection of the input pipe line with various output pipe lines will be effected. A similar arrangement, which provides a wheel spider with a revolving pipe instead of the rotary switching valve, is disclosed in CH-PS 140 556. Slidable diverters, as they are described in GB-PS 1 423 355 or DE-GM 1 968 572, are preferred due to their flat construction, with the sliding valve body being designed with two channels.

The slidable diverters are employed particularly in cases where only few output pipe lines are to be switched over. In DE-GM 1 915 363 and in GB-PS 133 315 there are disclosed spherical diverters, or cylindrically-shaped revolving diverters.

In DE-AS 1 280 788 an arrangement is described which is used in pneumatic packing, in which case a slide displaceable across the blowing direction of the material carries a conveying tube running along the blowing direction of the material, as well as a curved output pipe line. This slide system is a sort of "open" system, which effects only one single pipe connection.

The DE-GM 1 968 572 describes a segment path diverter for pneumatic tube conveyors, with a chamber comprising two pipe bend sections and corresponding to the valve body being displaced within a casing. The relatively voluminous chamber is moved by a toothed gearing on running wheels along guide rails arranged within the casing.

All these diverters, differing very much from one another due to their different kind of functions, have one problem in common. The selective connection between various connection pieces via the channels within the valve body or the switching valve must be leakproof, and the valve body is to be adjusted as easily and precisely as possible, with no material conveyed being allowed to enter the casing.

With the diverters mentioned above, by way of example, this is solved in a different manner. Specially constructed, accurately fitting valve bodies—mostly revolving switching valves—or slides fitted into the inner surface of the casing are employed. In the case of multichannel diverters, a sort of tubular frame valve body is used so as to facilitate the shifting operation. When displacing the valve body, it may be guided, on the one hand, by the casing itself, and, on the other hand, if the valve body is fitted in appropriately, via a guide unit located on the inner surface of the casing, as this is shown in DE-GM 1 968 572 by way of example, or else—when dispensing with closed casings—via independent guide units.

However, for particular applications, a closed casing will be required, for example when the conveying medium is a poisonous gas which is not allowed to leak outside, or is sensitive to oxygen, that is to say, when no air is allowed to enter the conveying channel. A further problem occurring in the case of bulk materials is caused by the fact that remnants of the material conveyed might enter the interior of the casing when shifting the valve body, unless the channel is blown empty before the shifting operation, which would require a correspondingly great amount of time and energy.

In a known rotary diverter, a one-channel switching valve revolves in a gastight casing. When using such an arrangement, the passage between the connection flanges of the casing and the channel is not leakfree. The escaping leakage air reaches a free interspace between the switching valve and the casing. Also in such a case, the inner surface of the casing must be machined and shaped very precisely since the inner surface of the casing has to assist the rotational operation in guiding it.

The attachment of seals to the connection flanges, the fitting of the valve bodies into the casing or the time-consuming intermediary step of blowing free the connecting passage of the valve body: all these measures solve only partial problems and entail—particularly in the case of larger diverters—either a waste of time and energy or an extremely costly manufacture as this must be very precise.

SUMMARY OF THE INVENTION

Consequently, the task arises to design a diverter that corresponds to all the requirements mentioned above, and where it is possible to manufacture the casing without a special, highly precise machining. This will be achieved by using an arrangement in which there is provided a free gas chamber between valve body and casing, and wherein the valve body within this gas chamber—with the exception of the area of the front and end surfaces of the channel(s)—is so arranged that it does not have contact with the inner surfaces of the casing.

If the valve body within the gas chamber and thus, within the casing, is designed as running along the inner surface of the casing without, however, touching it, then the latter does not have to be wrought in a special way so as to ensure the guidance of the valve body, or to accomodate it, respectively. The same thing holds true if sealing plates are provided within the interior of the casing, which sealing plates are assigned to the tubular connection pieces on the outer side of the casing, and co-operate with the connecting surfaces at the end sections of the channels of the valve body. Known sealing rings, which, in particular, are inflatable, seal the gap in between the sealing surface, and the connecting surface. With such an arrangement, it is of crucial importance to arrange the gaps within the interior of the casing, so that any possible escapping conveying medium can enter only the gas chamber, even in the case of an insufficient operatability of the seals. In a known manner, the sealing rings can be inflated by the conveying medium itself, so that they contract during the shifting process in a self-acting way.

If the casing is designed gastight and a free gas chamber is provided in between the valve body and the casing, then, on the one hand, any possible poisonous conveying gases cannot leak outside, thereby polluting the environment, and, on the other hand, if this gas chamber is filled, for example, by an inert gas, or is vacuumized, respectively, the conveying materials sensitive to oxygen cannot come into contact with air penetrating from the outside, in which case the gas chamber may accomodate an appropriate volume of inert gas, which (until repairing any possible leakages) is capable of cutting off the influx of air. This effect would also occur in the case of a vacuum, for which reason the gas chamber should have a certain minimum measure, in particular if the casing is designed gastight.

If the casing delimiting the gas chamber is designed substantially symmetrical with respect to rotation, it is particularly resistant to compression. For slidable diverters a cylindrical shape is probably suited best, in which case the cylinder axis runs parallel to the direction of displacement. However, also spherical-symmetrical casings, which are advantageously employed with rotary diverters, will be possible.

If an additional tubular connection piece is provided on the casing, via which the gas may be admitted or exhausted, then both the maintenance of the diverter, that is the degasing and the filling operation with inert gas, or the pumping out of the gas chamber, respectively, will be simplified.

Since the guide unit, which does not have any contact with the inner surface of the casing, is located within the gas chamber, there is a wide choice of possible solutions in designing, constructing and machining the inner surface of the casing. Furthermore, the contacting surfaces of the valve body may be essentially restricted to the end walls of the channels. The volume of the valve body can be minimized, and shifting requires little energy and can be carried out with greater accuracy. Particularly in the case of larger diverters, a double guide unit engaging different sides of the valve body is to be preferred, as this contributes to secure the path of motion of the shifting operation and improves the balance of the weight forces.

For a slidable diverter, a straight motion guide appears to be suited best as a guide unit (for example in the form of telescopic guiding devices, scissors guides, guide frames, and the like); particularly advantageous is a column guiding device onto which are mounted guide sleeves connected to the valve body. For a statically determined guidance, preferably either of two slide bars should carry a bi-furcated guide sleeve. In the case of a hot conveying medium and/or conveying materials, the diverter body will expand more widely than the casing. By choosing an appropriate cross-section of the slide bar mounted on the bi-furcated guide sleeve, the slide bar is capable of giving way in the case of a heat dilatation, and any possible tensions arising on the passage openings of the casing will be reduced. When using such an arrangement, it is advantageous to design the slide bar as being fixed to the casing and having a cross-section with at least one flat periphery, the slide bar being borne, at least partially, by a guide sleeve of a particularly bifurcated shape, connected to the valve body, since then the guiding surface for the fork will be enlarged and a point or line contact, leading to greater wear and finally to inaccuracies, will thus be avoided.

A sealing arrangement with a sealing plate assigned to the connection piece can be employed—apart from its sealing function during the conveying operation itself—also for the additional sealing of the channel opening during or after the shifting, if a sealing element is formed by a sealing plate extending across the axis of the connection channel, the plate having at least one passage opening corresponding to the end surface(s) of the channel, so that those areas of the end surfaces are sealed in each position of the valve body which have no cross-sectional area in common with the passage opening. In this arrangement, such a sealing plate is generally suitable also for all those shifting parts in which pipes are displaced relatively to stationary walls. In the same way, an annular seal mounted on a tubular sealing holder, which can be inserted into a cavity of the casing from the outside, will be of general interest since then the seal, in conjunction with the supporting ring, can be dismounted from the outside without the necessity arising to dismount the compressed-air connection as well.

With such an arrangement, it is also conceivable to design the sealing plate with some free motion, which would just allow to prevent any possible bulk material left in the channel of the diverter body from penetrating into the casing. It is, however, preferred to dispose a biasing means for urging the sealing plate in a direction perpendicular to the shifting direction of the valve body against the end surfaces of the connecting channel.

To facilitate the shifting operation, the front surface of the channel and the sealing plate are conveniently provided with a layer of low friction material.

The use of such a sealing plate is possible for any kind of diverter, whether this be a one-channel or multi-channel diverter, rotary or slidable diverter. The time-consuming operation of blowing empty the channels may thus be dispensed with, or—particularly when using it within rotary diverters—the inner surfaces of the casing do not have to be machined precisely, respectively; the sealing plate will take charge of their funtion during shifting operation. Since the sealing plate is located within the casing, it is not necessary to design it as stable or resistant to pressure, as this is done with the casing; if desired, it is replaceable and can be chosen according to the conveying requirements.

BRIEF DESCRIPTION OF THE DRAWINGS

Other characteristics of the invention will result from the description of embodiments schematically shown in the drawings, in which FIG. 1 is a cross-section across a multi-channel slidable diverter as provided by the invention, of which FIG. 1A shows an enlarged detail of the attachment of the sealing rings;

In FIG. 1 there is represented a multi-channel diverter provided by the invention. Within a cylindrical casing 1, a valve body 2, which, in this case, has two channels 3a and 3b, is displaceable in a direction perpendicular to the drawing plane. Accordingly, materials may be conveyed either through channel 3a, as shown in FIG. 1, or, after displacing valve body 2, through channel 3b. Three connection pieces 4a, 4b and 4c provide the connection to the conveying pipe lines, with 4c generally being the connection piece of the input pipe line, and 4a and 4b the connection pieces for the output pipe lines to be selected. The connecting flanges 5a and 5b at the end sections of the two channels 3a and 3b co-operate in their respective open positions with a sealing system 6 assigned to the corresponding connecting pieces 4. When using such an arrangement, there are provided sealing plates 7 fitted with passage openings which correspond to the ones of channel 3, hereinafter designated as channel end surfaces 8, with the sealing rings 10 serving to seal the separating lines 9 in between sealing plates 7 and connecting flanges 5, and being inflatable via the pneumatic lines 11 in a manner known per se and not shown in the drawings.

Figure 2A:
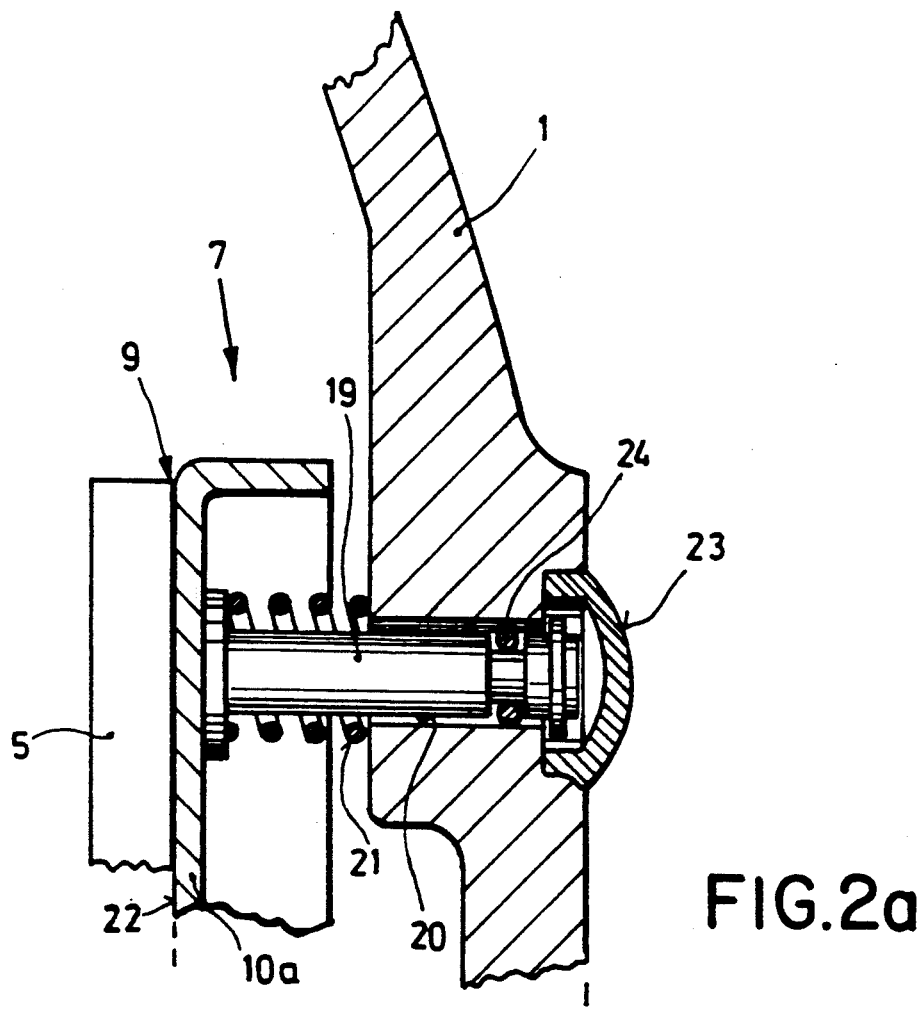
FIGS. 2a and 2b represent two partial sections across sealing plates as provided by the invention.

The sealing rings 10 are preferably situated within a tubular sealing holder 26, to which they are advantageously attached by means of fastening screws 27 engaging a clamping ring 31 (FIG. 1A). The flanges 4' of the tubular connection pieces 4a to 4c facing these sealing holders 26 are therefore provided with at least one, for example an annular recess 28, which accomodates the ends of screws 27, as this is shown in the drawing. Alternatively, and preferably, however, the recess 28 will be provided in the respective sealing holder 26, since after unscrewing the fastening screws, the tubular connection pieces 4a to 4c can be drawn out sideways between diverter and conveying pipe. It is advantageous to design the respective connection pieces 4a, 4b and 4c longer than sealing holder 26 in axial direction, since then the ring 26 can be drawn out of its recess without having to displace the conveying pipe, in which course the illustrated diverter is arranged.

After dismounting the respective connection pieces 4a to 4c, the sealing holders 26 are put into a recess of a ring bearing 29 connected to casing 1 in a pressure- or gastight way, e.g., by being welded on, and thus can easiely be exchanged from outside, if this should be required, without the necessity arising to open casing 1 for this reason.

It will be apparent from the drawing that the lines 11 are to lead into the tubular sealing holder 26 at a certain place, and therefore, it is advantageous to design the respective sealing holder 26 with at least one orienting surface, e.g., a flattening of its circumferential surface, a projection embedded in a groove, and the like, which orienting surface co-operates with a corresponding opposite surface of the ring bearing 29. However, it will be preferred to make line 11 lead into an annular recess provided on the sealing holder 26, which annular recess—if seen in axial direction—is preferably sealed on either side by O-rings or other sealing rings arranged in further circumferential grooves, whereby the machining of the surfaces will be simplified.

In this way, it will be possible to exchange the sealing rings 10 without having to dismount the casing, only after removing the respective connection piece 4, and this holds true not only for the diverter shown here but also for valve constructions, such as rotary valves, and the like. A preferred embodiment (in the sense of the foregoing explanations) of a sealing holder 126 is apparent from FIG. 3.

Figure 3:
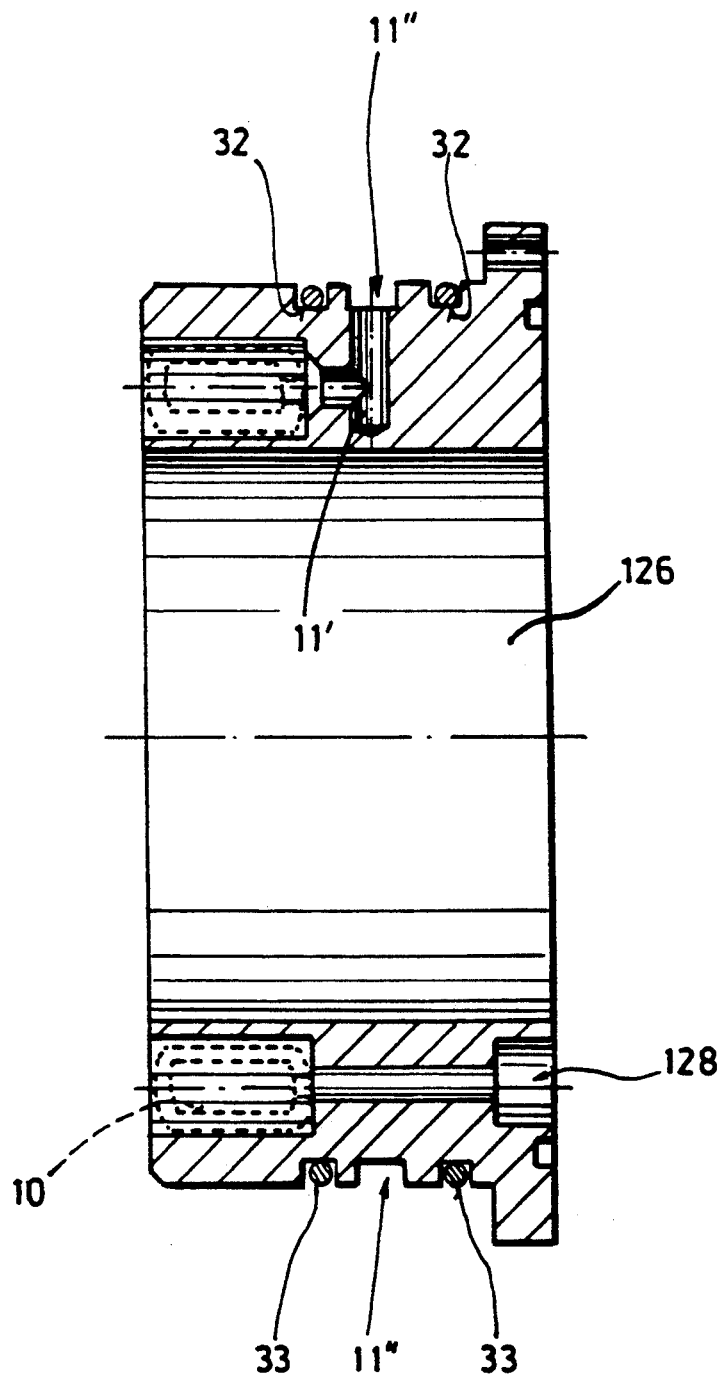
FIG. 3 illustrates an alternative embodiment of a tubular sealing holder used in accordance with the invention in an axial section.

According to FIG. 3 an annular recess 11" surrounding the sealing holder 126 is provided and connected to the channel 11' in the holder, corresponding to channel section 11 of FIG. 1. Whatever the position of the sealing holder 126 in its cavity of the casing (apparent from FIG. 1) may be, into which the channel 11 of the holder leads, the input channel 11 of the ring bearing 29 will always lead into the annular recess 11", from which place the fluid reaches the branch channel 11'.

To avoid pressure fluid losses, it will be advantageous to provide circumferential grooves 32 on either side (seen in axial direction) of annular recess 11", which circumferential grooves 32 receive sealing rings 33, particularly O-rings, as represented. As mentioned above, it is convenient to provide recesses 128 on sealing holder 126 (instead of the recesses 28 on flange 4' according to FIG. 1) in order to simplify dismounting.

When shifting valve or diverter body 2, the compressed-air supply will be interrupted, the sealing rings 10 contract, and valve body 2 can be shifted with lower friction than this is done with the conventional constructions. These sealing rings 10 may also be designed—as described in DE-A-40 39 982 the entire disclosures of which are incorporated herein by reference—as being inflatable by means of the conveying medium itself.

The contacting surfaces of the valve body 2 itself are essentially confined to the walls of the channels 3 and of any possible connection flanges, which, however, does not means that the embodiment shown herein as open pipes having a displacement direction perpendicular to the plane of FIG. 1, might not be provided within a prismatic block. Yet in each case, a free gas chamber 12 made gastight, if required, by sealing devices (not shown) will be provided between valve body 2 and casing 1, into which gas chamber 12 leaking conveying medium from gap 9 may penetrate. Since casing 1 itself is gastight and, due to the symmetrical construction with respect to rotation, also correspondingly resistant to compression, this gas chamber 12 turns out to be advantageous in various ways. Thus, poisonous conveying gases can hardly leak outside, where they would endanger the operating staff. Materials which are sensitive to oxygen can be conveyed without any difficulties because inert gas, or a vacuum within the gas chamber 12, respectively, provide an additional protection barrier. For this purpose, an additional connection piece 13 will be arranged on the casing, which connection piece 13 can be closed in a gastight way by a cover 14 merely shown schematically. In fact, a nonreturn valve (not shown) will be assigned to the connection piece 13 so as to prevent the air from penetrating into the casing when screwing on cover 14 again after filling the gas chamber with protective gas. In this way, leakage gas that has penetrated into the gas chamber 12 can be disposed of, or inert gas may be supplied into it, or the gas chamber 12 may be evacuated.

The shifting of valve body 2 takes place by means of a drive (not shown) of a known manner located outside the casing. The guidance of valve body 2 occurs via a guide unit 25 situated within gas chamber 12. For larger valve bodies 2 and/or shifting movements a double guidance—as shown in FIG. 1—is to be preferred. When using such an arrangement, the guide sleeves 15 and 16 are connected to valve body 2. In this arrangement, the slide bars 17 and 18 are surrounded by these sleeves 15, 16 and have their ends fixed to the side walls of the casing. A slide bar 17 carries the appertaining guide sleeve 15, whereas—as determined in a statical way—the other slide bar 18 runs through a substantially bi-furcated guide sleeve 16.

When conveying a hot conveying medium, or by means of a hot conveying medium, the diverter body 2, through which the gases flow, will naturally expand more than casing 1. As a result, the contact surface of guide sleeve 16 attached to slide bar 18 may change, without any tensions being allowed to arise between the guidance 25 and the diverter body expanded under the action of heat, which tensions would arise if instead of fork 16 a round sleeve 15 were provided.

Figure 2B:
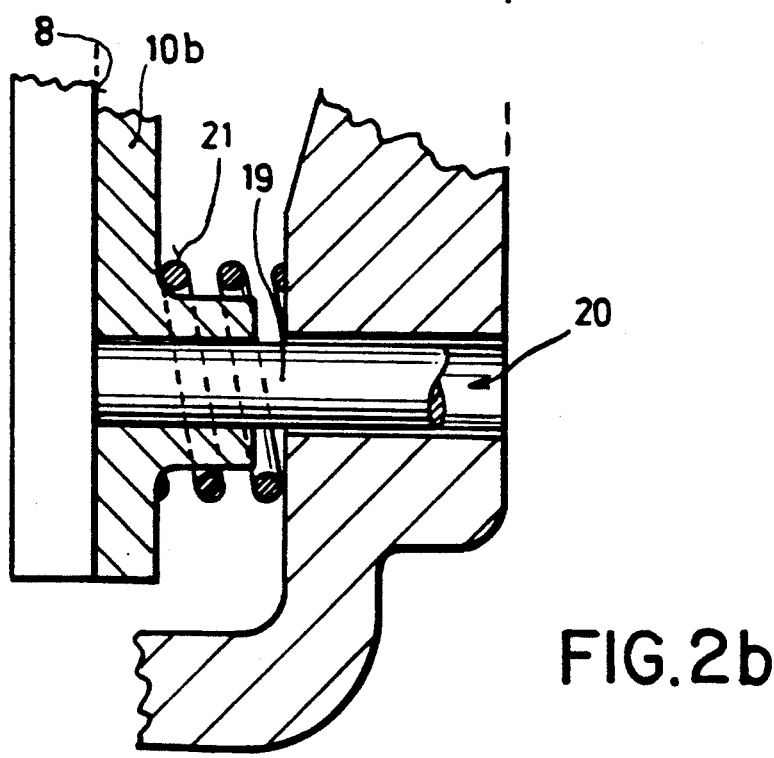

In FIG. 2 two partial sections are shown as embodiments of a sealing plate 7 in accordance with the invention. It is kept by means of bolts 19 attached thereto, which bolts 19 are located in openings 20 within casing 1. Between casing 1 and sealing plate 7, there is provided an elastic intermediary element in the form of a steel pressure spring 21 which makes the sealing plate 7 fit tight to end flange 5. The sealing surface 22 of sealing plate 7, which surface faces connection flange 5, closes the channel end surface 8 when valve body 2 is shifted, so that remnants of the material conveyed are prevented from penetrating into the interior of the casing. In order to ensure this, the sealing plate 7 must fit tight to connection flange 5 before, during and after the shifting of valve body 2, that is to say, in any possible position of valve body 2, even though a small gap being smaller than the particle size would be admissible. For slidable diverters, such as the one of FIG. 1, such a sealing plate 7, therefore, has a sealing surface 22 arranged parallel to the direction of displacement and perpendicular to channel end surface 8. The connection flanges 5 may be designed as broad rings. It is apparent from FIG. 1 that the respective flange 5a, or 5b, respectively, displaceable relatively to the sealing plate, is provided with a coating 5a' or 5b', so as to improve the friction conditions. This coating advantageously has a coefficient of friction of maximum 0.7, which, however, preferably lies below 0.5, if desired, around 0.1. If, for example, a polyamide- or a polytetrafluor ethylene coating (other polyethelenes, such as low-pressure polyethelene would be possible as well) is chosen for coating 5a', a coefficient of friction of 0.04 up to 0.45 will result in dependency upon the synthetic employed.

On the other hand, in accordance with the chosen degree of abrasion resistance, it may be desirable to dispose a hardened layer of stainless steel 5b' and/or 7' (preferably both of them) either in the form of a coating or as a plate appropriately attached thereto. A special advantage of such a coating 5a' or 5b', 7' is to be found in that the machining of these somewhat more delicate surfaces will be simplified, which in turn results in an altogether cheapened manufacturing process.

If so desired, a shifting device for the springs 21, conveniently operatable from outside, may be provided, but this will not be necessary in general, the embodiment represented with a predetermined elastic force being preferred in this respect.

However, a sealing plate 7 as provided by the invention may also be used in one-channel and multi-channel rotary diverters.

In this case, narrow front surfaces of the channels, or rounded connection flanges are in communication with the sealing surface during the shifting operation.

The openings 20 in casing 1 for the bolts 19 are provided with a cap 23 outside, which may be designed as gastight, yet the arrangement of an O-ring may be sufficient for sealing purposes. Such a sealing ring, which will be preferred in comparison with a stuffing box seal, and the like, would be advantageous also in the case of a gastight cap 23.

The sealing plates 7 may consist of steel sheet 10a with bolts 19 being welded on, or of castings 10b with ribs for stabilizing purposes and for accomodating the compression spring. The sealing surface 22 as well as the contact surface on valve body 2, whether this be a connection flange 5 or merely a front surface, may be provided or coated with a layer of low friction material detachable, if desired, or they may even consist of such a material, in order to reduce any possible sliding friction.

What is claimed is:

1. A line diverter selectively connecting at least one input pipe line to at least first and second output pipe lines, said line diverter comprising
    a valve body movable between at least a first position and a second position and including
        at least one connecting passage extending along a passage axis, and including end surfaces on either side of said connecting passage, each of said surfaces being arranged within a plane extending across said passage axis to surround said passage,
    a casing enclosing said movable valve body and including at least three tubular connection means extending each along a corresponding connection axis, each having a front surface facing one of said end surfaces of said valve body in at least one of its positions for connecting
        a) in said first position of said movable valve body at least said input pipe line and one of said output pipe lines to said end surfaces, and
        b) in said second position of said movable valve body at least one different output pipe line to one of said end surfaces,
    said casing having an inner surface surrounding said valve body and forming a gas filled interspace being between said inner surface and said movable valve body to give contactless freedom of motion to said movable valve body on all sides with exception of the area of said front surfaces and said end surfaces, and
    guiding means located within said casing for guiding said valve body during motion of said valve body within said casing, said guiding means comprising a slide bar element and a guide sleeve element enveloping at least a part of said slide bar element, one of said elements of said guiding means being fixed to said casing and a second of said elements of said guiding means being fixed to said valve body.

2. Line diverter as claimed in claim 1, wherein said casing is gastight.

3. Line diverter as claimed in claim 1, wherein said interspace has a volume of at least the size of the volume of one of said connecting passages.

4. Line diverter as claimed in claim 1, wherein said casing has at least one axis of rotational symmetry.

5. Line diverter as claimed in claim 1, wherein
    said casing is cylindric and said movable valve body is displaceable along an axis parallel to the axis of cylindric casing.

6. Line diverter as claimed in claim 1, wherein said casing comprises at least one additional opening.

7. Line diverter as claimed in claim 1, wherein said planes on either side of said connecting passages extend normal to said passage axis.

8. Line diverter as claimed in claim 1, wherein said guiding means is constructed as a straight motion guide.

9. Line diverter as claimed in claim 1, wherein said guiding means is located within said interspace.

10. Line diverter as claimed in claim 1, wherein said guiding means comprises two sets of guiding elements.

11. Line diverter as claimed in claim 10, wherein said sets of guiding elements are located at two different sides of said valve body.

12. Line diverter as claimed in claim 1, further comprising
 a sealing holder having a front surface and holding means for carrying an annular sealing ring, said casing having an outer cavity surrounding said connection axis for receiving said sealing holder.

13. A line diverter selectively connecting at least one input pipe line to at least first and second output pipe lines, said line diverter comprising
 a valve body movable between at least a first position and a second position and including
 at least one connecting passage extending along a passage axis, and including end surfaces on either side of said connecting passages, each of said surfaces being arranged within a plane extending across said passage axis to surround said passage,
 a casing enclosing said movable valve body and including at least three tubular connection means extending each along a corresponding connection axis, each having a front surface facing one of said end surfaces of said valve body in at least one of its positions for connecting
 a) in said first position of said movable valve body at least said input pipe line and one of said output pipe lines to said end surfaces, and
 b) in said second position of said movable valve body at least one different output pipe line to one of said end surfaces,
 said casing having an inner surface surrounding said valve body and forming a gas filled interspace being between said inner surface and said movable valve body to give contactless freedom of motion to said movable valve body on all sides with exception of the area of said front surfaces and said end surfaces, and
 guiding means for guiding said movable valve body while moving within said casing,
 wherein said guiding means is located within said interspace, and
 said guiding means comprises at least one slide bar being fixed to said casing and at least one guide sleeve being fixed to said valve body and at least partially enclosing said slide bar.

14. Line diverter as claimed in claim 13, wherein said slide bar has a cylindrical surface of which at least one portion is flat.

15. Line diverter as claimed in claim 13, wherein said guide sleeve is bifurcated.

16. A line diverter selectively connecting at least one input pipe line to at least one output pipe line, said line diverter comprising
 a valve body movable between at least a first position and a second position and including
 at least one connecting passage extending along a passage axis, end surfaces on either side of said connecting passage, each of said surfaces being arranged within a plane extending across said passage axis to surround said passage,
 flange means on at least one side of said passage, said flange means forming at least one of said end surfaces,
 a casing enclosing said movable valve body and including at least two tubular connection means to contact the end surfaces of said connecting passage and at least one of said connection means facing said flange means,
 at least one contact plate being located within said casing for engaging at least one of said end surfaces,
 guiding means located within said casing for guiding said valve body during motion of said valve body within said casing, said guiding means comprising a slide bar element and a guide sleeve element enveloping at least a part of said slide bar element, one of said elements of said guiding means being fixed to said casing and a second of said elements of said guiding means being fixed to said valve body, and
 sealing elements being pressable against said end surface.

17. Line diverter as claimed in claim 16, wherein said sealing elements are inflatable.

18. A sealing arrangement for a line diverter for selectively connecting at least one input pipe line to at least one output pipe line, by means of
 a valve body movable in a switching direction within a casing between at least a first position and a second position connecting and disconnecting said input line and said output line and having at least one connecting passage end surfaces facing front surfaces of tubular connection means on said casing when connecting said lines,
 said sealing arrangement comprising at least one sealing element located within said casing including
 a contact plate arranged within a plane intersecting the axis of said connecting passage so as to face one of said end surfaces, said contact plate having an opening for connecting said connecting passage to said tubular connection means in said first position of said valve body,
 a sealing area for sealing said passage in said second position of said valve body, and
 guiding means located within said casing for guiding said valve body during motion of said valve body within said casing, said guiding means comprising a slide bar element and a guide sleeve element enveloping at least a part of said slide bar element, one of said elements of said guiding means being fixed to said casing and a second of said elements of said guiding means being fixed to said valve body.

19. Sealing arrangement as claimed in claim 18, further comprising
 pressing means for pressing said contact plate with a predetermined force against said end surface of said connecting passage.

20. Sealing arrangement as claimed in claim 18, further comprising
 at least one pressing element for pushing said contact plate along said guide means against said end surface.

21. Sealing arrangement as claimed in claim 20, wherein
 said guiding means includes at least one bolt shaped guidance.

22. Sealing arrangement as claimed in claim 20, wherein said pressing element is a spring.

23. Sealing arrangement as claimed in claim 18, wherein said sealing area is coated by a layer of a low friction material.

24. Sealing arrangement as claimed in claim 18, wherein at least one of said end surfaces is coated by a layer of a low friction material.

25. A sealing arrangement for a line diverter for selectively connecting at least one input pipe line to at least one output pipe line, by means of
- a valve body movable in a switching direction within a casing between at least a first position and a second position connecting and disconnecting said input line and said output line and having at least one connecting passage end surfaces facing front surfaces of tubular connection means on said casing when connecting said lines, said sealing arrangement comprising at least one sealing element located within said casing including
- a contact plate arranged within a plane intersecting the axis of said connecting passage so as to face one of said end surfaces, said contact plate having an opening for connecting said connecting passage to said tubular connection means in said first position of said valve body, and
- a sealing area for sealing said passage in said second position of said valve body,
- guide means for guiding said sealing plate when moving relative to said casing, and
- at least one pressing element for pushing said sealing plate along said guide means against said end surface,
- wherein said guide means includes at least one elongated guidance element fixed to said sealing plate and projecting into a corresponding guide opening in said casing.

26. Sealing arrangement as claimed in claim 25, wherein said guide opening leads to the outer side of said casing and the predetermined force of said pressing element is adjustable from outside said casing.

27. Sealing arrangement as claimed in claim 25, further comprising guidance sealing means between said guidance element and said casing within said guide opening.

28. Sealing arrangement as claimed in claim 27, wherein said guidance sealing means include an o-ring around said guidance element.

29. A sealing arrangement for a valve body movable within wall means forming a casing for enclosing said movable valve body said wall means having inner and outer surfaces, said outer surface comprising at least one cavity surrounding a tubular passage having an axis, said sealing arrangement comprising
- a tubular sealing holder located in said cavity and being mountable from outside said casing, said sealing holder having a flat front surface and a circumferential surface, an annular recess being arranged in said front surface,
- a sealing ring within said recess, and fastening means for releasibly fastening said sealing ring in said recess,
- wherein said tubular sealing holder is formed by a mounting ring surrounding said circumferential surface for accommdating said cavity.

30. Sealing arrangement as claimed in claim 29, wherein said sealing ring is hollow and inflatable, said sealing arrangement further comprising
- means defining a fluid line for supplying fluid into the interior of said inflatable sealing ring.

31. Sealing arrangement as claimed in claim 30, wherein said fluid line comprises
- channel means passing through said sealing holder.

32. Sealing arrangement as claimed in claim 31, wherein said channel means extend substantially in radial direction with respect to said axis.

33. Sealing arrangement as claimed in claim 31, wherein said fluid line comprises
- a first ring recess on said circumferential surface, said first ring recess being connected to said channel means.

34. Sealing arrangement as claimed in claim 33, wherein said sealing holder includes
- first and second annular sealing members arranged on both axial sides of said first ring recess and
- a second ring recess and a third ring recess provided within said circumferential surface on both axial sides of said first ring recess for holding said first and second annular sealing members firmly on said circumferential surface.

* * * * *